United States Patent [19]

Le Pimpec

[11] Patent Number: 5,421,202
[45] Date of Patent: Jun. 6, 1995

[54] LIQUID SENSOR HAVING THERMISTORS

[75] Inventor: Michel Le Pimpec, Montigny Le Bretonneux, France

[73] Assignee: Intertechnique, Plaisir, France

[21] Appl. No.: 113,296

[22] Filed: Aug. 30, 1993

[30] Foreign Application Priority Data

Aug. 28, 1992 [FR] France ............... 92 10361

[51] Int. Cl.⁶ ............................................ G01F 23/24
[52] U.S. Cl. ................................. 73/295; 374/54; 338/28
[58] Field of Search ................ 73/295; 338/23, 25, 338/28; 340/622; 374/54, 185

[56] References Cited

U.S. PATENT DOCUMENTS

| 3,363,466 | 1/1968 | Guidi | 374/185 X |
|---|---|---|---|
| 3,559,883 | 2/1971 | Buiting et al. | 374/185 X |
| 3,863,210 | 1/1975 | Roland | 340/450 |
| 4,276,536 | 6/1981 | Wisnia | 338/23 |
| 4,619,140 | 10/1986 | Kühnel | 73/295 |
| 4,702,619 | 10/1987 | Camp et al. | 374/144 |
| 5,111,692 | 5/1992 | McQueen et al. | 73/295 |

FOREIGN PATENT DOCUMENTS

| 1456920 | 9/1966 | France . | |
|---|---|---|---|
| 2515342 | 4/1983 | France . | |
| 3341630 | 5/1985 | Germany . | |
| 22948 | 2/1977 | Japan | 73/295 |

Primary Examiner—William A. Cuchlinski, Jr.
Assistant Examiner—Willie Morris Worth
Attorney, Agent, or Firm—Larson and Taylor

[57] ABSTRACT

A sensor for detecting whether liquid is present at a location in a tank, comprises a probe placed at the location, containing a negative temperature coefficient resistor (NTC) and a positive temperature coefficient resistor (PTC) mutually connected in series relation. The positive temperature coefficient resistor exhibits a progressive resistance variation responsive to temperature change. An electrical power source delivers a constant electric current to the probe. The detector further comprises a comparator for comparing the total resistance of the serially mounted resistors with a threshold.

10 Claims, 1 Drawing Sheet

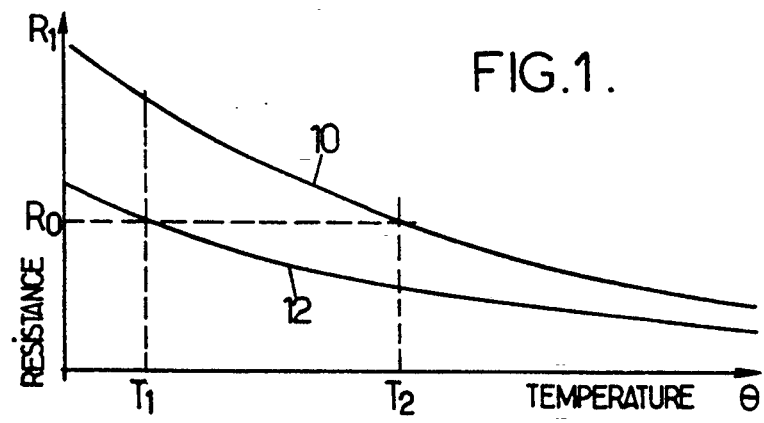
FIG.1.
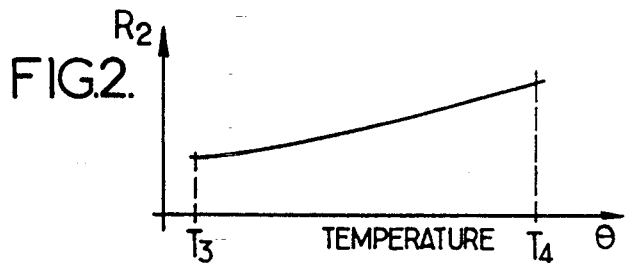
FIG.2.
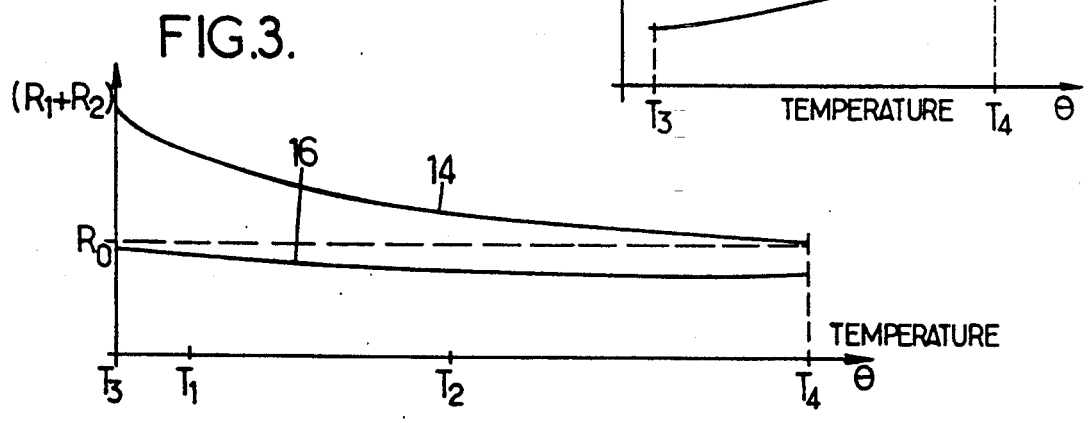
FIG.3.
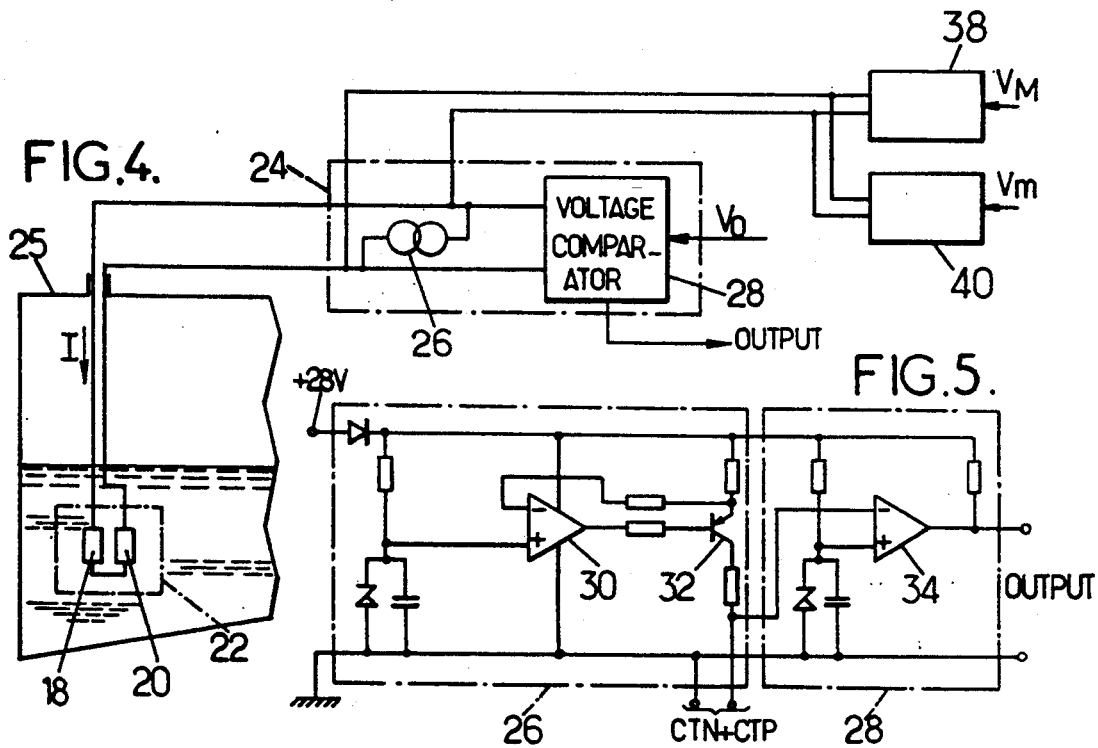
FIG.4.
FIG.5.

LIQUID SENSOR HAVING THERMISTORS

BACKGROUND OF THE INVENTION

The present invention relates to sensors for sensing the presence of a liquid, suitable for use as liquid level sensors in a tank, the sensor being of the type comprising a probe containing a resistor having a negative temperature coefficient (NTC), an electrical power source for dissipating power in the probe by Joule effect, and means for comparing the resistance of the probe with a determined threshold, the resistors being used as thermistors.

Such sensors are based on the difference in thermal conductivity between liquids and gases. For the same heat power of a thermistor, the equilibrium temperature achieved is higher when the thermistor is in a gas than when it is in a liquid. By measuring the voltage difference across the terminals of the thermistor and given the current flowing through it, it is possible to determine its resistance and the medium in which the thermistor is located.

Present sensors operating on this basis suffer from severe limitations. In particular, they operate satisfactorily only when the temperatures of the liquid and of the gas vary little. Otherwise, it is not possible to determine the medium in which the probe is located merely by comparing its resistance with a single determined resistance. FIG. 1 illustrates this limitation for the particular case of a fuel level sensor placed in a tank and surmounted by air, the thermistor being of the NTC (negative temperature coefficient) type having an electrical resistance that varies in a manner that is close to being a negative exponential. The resistance $R_1$ of the NTC varies responsive to temperature $\Theta$ as shown by curve 10 when it is immersed in air, and as shown by curve 12 when it is immersed in fuel. If a constant discrimination threshold $R_0$ is used, then the level can be sensed only between two temperatures T1 and T2 that are relatively close together.

Another prior art sensor (French patent No. 2 515 342) uses a PTC whose resistance increases suddenly at a transition temperature. The total resistance of two thermistors in series is not measured. The thermistors are connected to a conventional power source.

SUMMARY OF THE INVENTION

It is an object of the invention to provide an improved liquid sensor. It is a more specific object to provide a sensor improved as regards reliability and measurement range.

To this end, there is provided a sensor for detecting whether liquid is present at a location in a tank, comprising:

a probe, to be placed at said location, containing a negative temperature coefficient resistor (NTC) and a positive temperature coefficient resistor (PTC) mutually connected in series relation;

an electrical power source for delivering a predetermined constant electric current to said probe, said positive temperature coefficient resistor exhibiting a progressive resistance variation responsive to temperature change; and means for comparing the value of the total resistance of the serially mounted resistors with a predetermined threshold.

By virtue of this disposition, and by using a PTC whose resistance in the middle of the set operating range is correctly proportioned to the resistance of the NTC, temperature compensation is ensured and the measurement range is considerably increased without it being necessary to change the discrimination threshold as a function of temperature.

In practice, the PTC will typically have a resistance in the middle of the measurement temperature range that lies between 1/10 and 1/100 of the resistance of the NTC. Consequently, the heat delivered by the PTC is very low compared with the heat dissipated in the NTC and causes practically no disturbance to the surrounding medium. Consequently, the resistance of the PTC is representative of the temperature of the medium in which it is immersed.

As a general rule, a PTC is used whose resistance varies responsive to temperature in a manner that is approximately linear.

Conventional liquid sensors require three feed wires, and thus three connection points. Two of the wires feed the probe with electrical current. The third wire serves to measure the voltage across the terminals of the thermistor, thus making it possible to derive the resistance thereof. An ancillary object of the invention is to decrease the number of connection points, which is particularly advantageous in aviation where connections are expensive to provide because of the quality required. To this end, the invention proposes a sensor in which the source of electricity is a constant current generator whereby the voltage across the terminals of the generator is representative of the resistance of the probe.

An additional advantage of this structure when used with a plurality of liquid presence sensors each including a probe placed at a different level in a tank for the purpose of making up a level sensor, is that the number of wires that need to penetrate into the tank is reduced by one third, which is particularly advantageous in aviation where it is desirable to reduce the number of wires penetrating into tanks. The weight saving is also advantageous.

The invention will be better understood from the following description of a particular embodiment given by way of non-limiting example. The description refers to the accompanying drawings.

BRIEF DESCRIPTION OF THE DRAWINGS

FIG. 1, already mentioned, shows how the resistance $R_1$ of a NTC varies responsive to ambient temperature, when placed in air and in a liquid, for a same predetermined current therein;

FIG. 2 shows how the resistance $R_2$ of a PTC varies as a function of temperature $\Theta$;

FIG. 3 is similar to FIG. 1 and shows how the total resistance of a probe constituting a particular embodiment of the invention varies as a function of ambient temperature when the probe is in air and when it is in a liquid;

FIG. 4 is a block diagram of a liquid level sensor according to the invention; and FIG. 5 is a possible block diagram for an electronic circuit suitable in the liquid sensor of FIG. 4.

DETAILED DESCRIPTION

The invention is based on the observation that it is possible to reduce the effect of ambient temperature on the resistance of an NTC type thermistor probe by connecting a PTC of considerably lower resistance in series with the NTC, the resistance of the PTC in the measurement range and its temperature coefficient being selected appropriately. To do this, a positive temperature coefficient resistor (PTC) is used whose resistance does not change suddenly, but rather varies progressively, i.e. its resistance-temperature characteristic curve does not include a bend with a curvature very much greater than that of the portions of the characteristics before and after the bend. In general, as shown in FIG. 2, the variation will be approximately linear over the entire set measurement temperature range, between $T_3$ and $T_4$.

Under such circumstances, the variation in the total resistance $R_1+R_2$ of the thermistor probe as a function of ambient temperature $\Theta$ when a predetermined constant current is flowing through the probe is of the kind shown by curve 14 when the probe is in air and by the curve 16 when it is in a liquid. It can be seen that it is then possible to determine without ambiguity the medium in which the probe is immersed by comparing the resistance $R_1+R_2$ with a fixed predetermined discrimination threshold $R_0$, for a temperature range $T_3$ to $T_4$, which is much greater than the range $T_1$ to $T_2$.

By way of example, an aircraft fuel sensor in a tank has been made using an NTC 18 having a resistance of about 10K$\Omega$ in the middle of the measurement range and a PTC 20 having a resistance of about 200 $\Omega$ in the middle of the measurement range. It is possible to determine whether the probe is in fuel or in air (or in an inert gas overlying the fuel) by comparison with a fixed value $R_0$ over a temperature range going from $T_3 = -30°$ C. to $T_4 = 90°$ C., which means that a temperature range of at least $-20°$ C. to $+60°$ C. can be used in practice.

As mentioned above, the invention makes it possible to implement a sensor having only two wires connecting the probe 22 to the measurement electronic circuit 24 associated therewith and located outside the tank 25. The electronics include a constant current generator 26 generating a current I and a voltage measuring circuit 28 which measures the voltage across the terminals of the generator 26 which is representative of the resistance of the probe. The circuit 28 also includes a comparator for comparing the voltage across the terminals of the generator 26 with a discrimination voltage $V_0$, representative of resistance $R_0$.

In particular, the constant current generator 26 may comprise a differential amplifier 30 and a bipolar transistor 32 whose emitter is fed back to the negative input of the amplifier (FIG. 5). The comparator 28 may be constituted by a discriminating circuit having a threshold differential amplifier 34.

A detector assembly may be constituted by a plurality of probes 22 placed at different levels in a tank and associated with common electronics 24 provided with switching means controlled by a sequencer and making it possible to determine which probes are immersed in liquid and which are in air.

It should be observed that the liquid sensor may easily be adapted so as to be capable of self-detection of any operating anomaly. This can be done merely by adding two additional comparators at the terminals of the constant current generator 26. A comparator 40 for comparing the voltage across the terminals of the constant current generator with a "minimum" voltage Vm serves to detect a short circuit which is represented by a collapse in the voltage across the terminals of the generator. A comparator 38 with a "maximum" voltage Vm serves to determine an open circuit situation which gives rise to an increase in the voltage across the terminals so large that a value is reached that is considerably greater than the maximum value liable to be encountered in normal measurement.

I claim:

1. Sensor for detecting whether liquid is present at a location in a tank, comprising:
    a probe to be placed at a location in a tank comprising a series arrangement of a negative temperature coefficient resistor and of a positive temperature coefficient resistor, said positive temperature coefficient resistor exhibiting a progressive resistance variation response to temperature change;
    an electrical power source connected to said series arrangement for delivering a predetermined constant electric current to said probe; and
    means for comparing the value of the total resistance of the series arrangement as represented by a voltage across said series arrangement with a predetermined threshold voltage value and for delivering an output signal responsive to said comparison.

2. Sensor according to claim 1, wherein said threshold voltage value has a constant value.

3. Sensor according to claim 1, for operation within a set temperature range, wherein said positive temperature coefficient resistor has a resistance in the middle of said range which is comprised between 1/10 and 1/100 of the resistance of said negative temperature coefficient resistor.

4. Sensor according to claim 3, wherein said positive temperature resistor has a resistance which varies responsive to temperature in accordance with a substantially linear law.

5. Sensor according to claim 1, wherein said positive temperature resistor has a resistance which varies responsive to temperature in accordance with a substantially linear law.

6. Sensor according to claim 1, wherein said electrical power source is a constant current generator and wherein said means are arranged for measuring a voltage across terminals of the generator, said voltage being representative of the total resistance of said series arrangement.

7. Sensor according to claim 6, for measuring a liquid level within a tank, wherein said electrical power source and said means are in a unit located out of said tank and are connected to said probe by only two wires.

8. Sensor according to claim 6, wherein said means further comprise additional comparison means for comparing the voltage across the terminals of the electrical power source with two other reference values, selected for determination of open and short circuit conditions of said probe.

9. Sensor for determining whether liquid is present at a location in a tank, comprising:
    a probe, to be placed at a location in a tank, comprising a series arrangement of a negative temperature coefficient resistor and of a positive temperature coefficient resistor, said positive temperature coefficient resistor exhibiting a progressive resistance variation responsive to temperature change;
    a constant current generator connected to said series arrangement for circulating a predetermined constant electric current in said series arrangement and for bringing said resistors to an equilibrium temperature; and
    means electrically connected to said series arrangement for comparing a voltage existing across said series arrangement with a predetermined discrimination value representative of a resistance value of said series arrangement which is between a value when said probe is immersed in a liquid and another value when said probe is out of the liquid and for delivering an output signal responsive to said comparison.

10. Sensor according to claim 9, wherein said electrical power source and said means are in a unit located out of said tank and are connected to that probe by only two wires.

* * * * *